No. 758,517. Patented April 26, 1904.

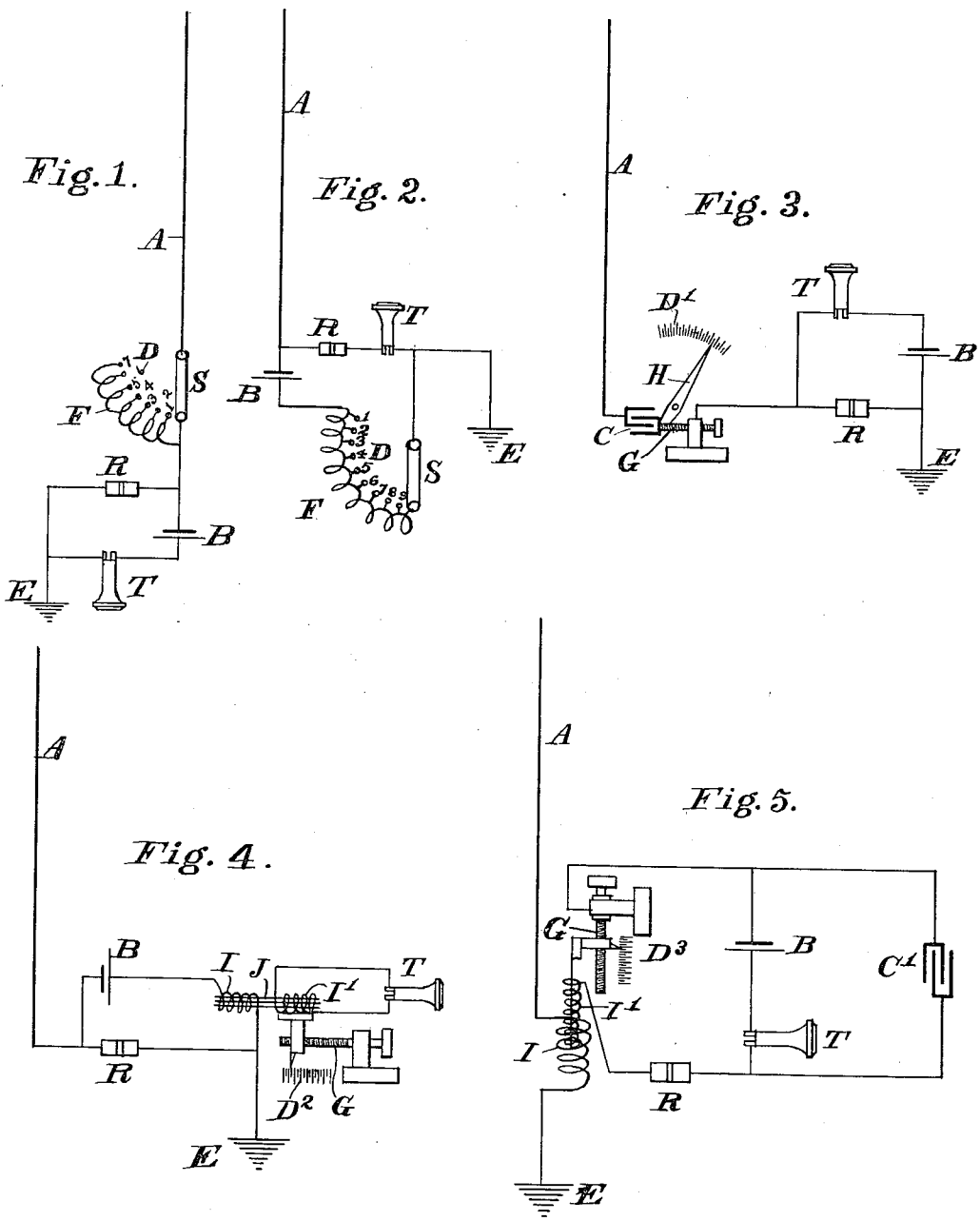

UNITED STATES PATENT OFFICE.

LEE DE FOREST, OF NEW YORK, N. Y.

ART OF WIRELESS TELEGRAPHY.

SPECIFICATION forming part of Letters Patent No. 758,517, dated April 26, 1904.

Application filed September 21, 1903. Serial No. 173,970. (No specimens.)

*To all whom it may concern:*

Be it known that I, LEE DE FOREST, a citizen of the United States, and a resident of the city, county, and State of New York, have invented certain new and useful Improvements in the Art of Wireless Telegraphy, of which the following is a specification.

My invention relates to an improvement in the art of wireless telegraphy whereby the distance of the transmitting or sending apparatus may be approximately determined.

The scope of my invention may be determined by inspection of the following description and claims.

The drawings annexed hereunto show different forms of apparatus which may be employed in carrying out my invention.

Figures 1 and 2 each show a receiving apparatus for carrying out my invention by varying the resistance of the local circuit containing the indicating device. Fig. 3 shows a receiving apparatus for carrying out my invention which employs a variable capacity in the circuit containing the indicating instrument. Figs. 4 and 5 show receiving apparatus for carrying out my invention employing a variable inductance to gage the distance.

With many forms of wireless-telegraph receiving apparatus the intensity of the action of the aerially-received waves upon the indicating mechanisms bears a definite relation to the distance of the station from which they were emitted, it being presumed that the intensity of radiation remains constant. If with such a receiving apparatus means be provided for measuring or indicating the intensity of the impulses received and the intensity of radiation being known, the separation of the transmitting and receiving stations may be at least approximately told by comparing such readings with readings obtained under corresponding conditions. There are many means known to the art by which this may be done. One simple form of apparatus which I have devised for doing this inserts a resistance in the circuit of the current induced by the aerially-received waves until the effect of said received impulses is neutralized or damped down to substantially zero or to any other standard or readily-determined point, said resistance being insertible by increments which bear a known ratio to the distance and power of a standard transmitter, the size of these increments having been previously carefully determined for different distances and for transmitting-stations of different power. With this information charted it is possible to quickly approximate the distance from a known station when the power thereof is known. Simple means of this character are shown in Figs. 1 and 2. In these, A represents the collecting conductor or antenna; F, the variable resistance, shown as coils of a rheostat; S, the movable arm of the rheostat, which in Fig. 1 is placed in series with the antenna and the wave-responsive device R and in Fig. 2 is placed in the local or telephone circuit; R, the wave-responsive device, which may be of any suitable type; T, a telephone-receiver or other suitable indicating or translating device; B, the local battery, and E the earth connection.

In the apparatus shown in Fig. 1 the variable resistance is adapted to be inserted in the aerial circuit between the antenna and the wave-responsive device, in which position the aerially-received impulses may be attenuated until they produce little or no effect upon the wave-responsive device.

In the apparatus shown in Fig. 2 the variable resistance is shown as adapted to be inserted in the local or telephone circuit where the result is to render relatively insignificant the changes in the said local circuit produced by the aerial impulses upon the wave-responsive device.

The method as illustrated in the device shown in Fig. 3 consists in the employment of a capacity which may be varied in amount instead of the resistance used in the apparatus shown in Figs. 1 and 2. This capacity is conveniently shown as a condenser C, which is varied in capacity by having one plate adjustable relative to the other, as by means of a threaded supporting-rod G. The intensity of the impulse transmitted through the condenser C in a measure depends upon the separation of its plates. If the plates are separated, less of the energy is transmitted to the wave-responsive device R. One of the plates or a member moving in correspondence there-with is preferably connected with an indicating device—such, for instance, as the pointer H—so as to magnify the motion, and a scale, as D', provided which indicates the amount of the movement in some arbitrary manner.

The form of device shown in Fig. 4 employs a variable inductance to secure the desired result. I have shown this inductance as affecting only the local circuit or that which contains the indicating instrument, although it will be obvious that it may be inserted between this local circuit and the antenna or in a position corresponding with the location of the capacity shown in Fig. 3.

In the form shown the indicating instrument or telephone T is not placed directly in the circuit which includes the wave-responsive device R, but is in a small circuit which contains a coil I', which is inductively acted upon by a coil I, located in the local circuit which includes the wave-responsive device and a battery B. A core J is common to both coils, and at least one of the coils and the core are relatively movable, thereby making it possible to vary the intensity of the inductive action communicated to the circuit containing the telephone or other equivalent indicating or translating mechanism. As herein shown, the coil I' is movable by means of a threaded rod G, so as to surround the core with more or less of the coil. In this way the intensity of the impulse received may be graduated anywhere within the limits of the device. Any of the moving parts may carry a pointer which will indicate upon a scale, such as $D^2$, the amount of the adjustment, said scale being so proportioned and marked that the readings thereof may be used in connection with a chart or tables previously prepared.

Fig. 5 shows another construction which may be employed in carrying out my invention. This is based upon the variable-inductance principle. The antenna-circuit is provided with a coil I, and the local circuit or that containing the wave-responsive device R is provided with a coil I', one of these being adapted to slide within the other, so as to vary the inductive effect of one upon the other. I have shown the coil I of the local circuit as mounted upon a sliding block which is actuated by a threaded screw G. A pointer carried by the block indicates upon a scale $D^3$ the adjustment of the coils. In this figure I have shown the local circuit as tuned by the use of a condenser C' to the period of the station from which the signals are sent. The indicating instrument T and the local battery B are in a bridge of this tuned circuit.

As a preliminary to the use of my method the exact amounts of the damping influence which are required to reduce the action of the aerial impulse to the standard of comparison under different conditions of use are determined and these results tabulated or chartered. This data should be determined for variation of power, length of antenna, distance, and all other elements which influence the intensity of the signal. This data should be tabulated in such form that no figuring would be required, but only a determination of the reading of the device and a reference to the chart or tables under conditions of apparatus corresponding with those then used.

As the height of antenna and length of spark-gap or other conditions which vary the force of radiation must be known, it is presumed that this data is known as to the transmitting-station whose distance it is desired to estimate either by reference to a table giving this data for regular stations or by a message previously sent.

It is obvious that my method may be practical by the use of other forms of apparatus than those shown. I do not, therefore, wish to be understood as limiting the practice of my invention to the forms of apparatus shown, but to broadly claim the method herein indicated irrespective of the forms of apparatus employed.

What I claim, and desire to patent, is—

1. The method of determining the distance to a sending wireless-signaling station which consists in employing a damping or choking influence of regulable amount in the receiving apparatus to thereby reduce the intensity of the signals received to a standard of comparison and in comparing the amount of the damping influence required with results obtained under known conditions and distances.

2. The method of determining the distance to a sending wireless-signaling station which consists in varying the percentage of the energy received which is communicated to the translating or indicating instrument and in comparing the percentage required to produce a standard effect with the percentages required to produce the same effect under known conditions.

3. The method of determining the distance to a sending wireless-signaling station which consists in employing a regulable resistance to dampen or choke down the energy received until a standard indication is produced upon an indicating instrument and in comparing the amount of resistance required for this purpose with the amount required to produce the same effect under known conditions.

In testimony whereof I have hereunto affixed my signature, this 9th day of September, 1903, in the presence of two witnesses.

LEE DE FOREST.

Witnesses:
GEORGE W. THOMAS,
H. L. REYNOLDS.